United States Patent [19]

Kawashima et al.

[11] Patent Number: 4,472,557
[45] Date of Patent: Sep. 18, 1984

[54] ELASTIC FLUOROHYDROCARBON RESIN AND METHOD OF PRODUCING SAME

[75] Inventors: Chikashi Kawashima, Kamifukuoka; Takashi Yasumura, Fujimi, both of Japan

[73] Assignee: Central Glass Company, Limited, Ube City, Japan

[21] Appl. No.: 495,949

[22] Filed: May 19, 1983

[51] Int. Cl.³ .................... C08F 259/08; C08L 51/00
[52] U.S. Cl. ..................................... 525/276; 525/72; 525/263
[58] Field of Search ........................... 525/72; 527/276

[56] References Cited

U.S. PATENT DOCUMENTS 3,676,190 7/1972 Landler et al. ..................... 525/276
4,151,225 4/1979 Büning ............................... 525/276
4,308,359 12/1981 Büning ............................... 525/276

FOREIGN PATENT DOCUMENTS 2952456 7/1980 Fed. Rep. of Germany ........ 525/72
54-135959 10/1979 Japan ................................. 525/276

Primary Examiner—Allan Lieberman
Attorney, Agent, or Firm—Schwartz, Jeffery, Schwaab, Mack, Blumenthal & Koch

[57] ABSTRACT

A fluorohydrocarbon resin that has elasticity and retains favorable properties of known fluorohydrocarbon polymers is obtained by graft copolymerization of a fluorine-containing elastomeric polymer with a fluorine-containing crystalline polymer. One of the elastomeric and crystalline polymers is prepared by copolymerizing at least one fluorine-containing monomer with at least one unsaturated monomer that has peroxy bond. When the elastomeric polymer is employed as the basic polymer and the crystalline polymer is polyvinylidene fluoride, the graft copolymerized fluorohydrocarbon resin is high in mutual solubility with polyvinylidene fluoride, so that the addition of this resin to polyvinylidene fluoride gives a resin composition which has elasticity and good low temperature characteristics.

20 Claims, No Drawings

ELASTIC FLUOROHYDROCARBON RESIN AND METHOD OF PRODUCING SAME

BACKGROUND OF THE INVENTION

This invention relates to an elastic fluorohydrocarbon resin and a polymerization method for producing the same.

There are various fluorine-containing crystalline polymers which serve as synthetic resins and have wide application by reason of their characteristic properties attributed to the presence of C—F bond, such as good heat resistance, high resistance to oils and many other chemicals and good weather resistance. However, these crystalline resins are unsuited to some uses wherein elasticity or flexibility of the employed resin is a matter of importance, as in the cases of pipes, gaskets, sealing elements, etc.

Where elasticity or flexibility is required besides the favorable properties of fluorohydrocarbon resins it is usual to use fluoroelastomer. However, fluoroelastomers fully exhibit their characteristic physical properties and particularly dynamic properties only after completion of a cross-linking process including the steps of kneading the fluoroelastomer in unvalcanized state with the addition of a cross-linking agent, fillers and stabilizers and subjecting the kneaded rubber to a heat treatment to accomplish cross-linking. It is inevitable, therefore, that molding of fluoroelastomer requires more complicated operations than molding of crystalline fluorohydrocarbon resins, and often restrictions are placed on the shapes of the fluoroelastomer articles. Besides, fluoroelastomers after the cross-linking process can hardly be remelted for the purpose of additional processing or working.

To obtain a fluorine-containing resin which has sufficient elasticity but does not need any cross-linking treatment, it has been tried to copolymerize a fluorine-containing monomer that is capable of providing a crystalline polymer having a relatively low glass transition temperature $T_g$ with a different monomer that is capable of sufficiently lowering the degree of crystallinity of the resultant copolymer. However, copolymers obtained by this method generally become lower in melting temperature and, hence, in the upper boundary of the temperature ranges in which the respective copolymers are practicable. Besides, the copolymers tend to undergo considerable changes in the modulus of elasticity with changes in temperature within the aforementioned ranges.

Also it has been tried to obtain a desirable resin by blending a crystalline fluorohydrocarbon resin with either a plasticizer or an elastic polymer. In practice, however, not so many kinds of plasticizers and polymers are known as sufficiently high in mutual solubility with crystalline fluorohydrocarbon polymers. Even when a blending material relatively high in the mutual solubility can be used, often it is impossible to use a desirably large amount of the blending material without adversely influencing the properties of the blended resin compositions. Furthermore, the blended resin compositions are liable to locally remain in a heterogeneously mixed state and, therefore, fail to fully exhibit the expected physical properties.

Among crystalline fluorohydrocarbon resins, polyvinylidene fluoride (will be abbreviated to PVDF) is well known as very stable even to highly corrosive chemicals, to ultraviolet rays and to radioactive rays, excellent in mechanical and electrical properties, and superior in workability to other fluorohydrocarbon resins. Accordingly, PVDF has wide applications and is largely used for laminating or coating metallic materials and for covering electric wires and cables.

However, PVDF lacks elasticity by reason of high degree of crystallinity and therefore has some shortcomings. For example, PVDF coverings on electric wires tend to spontaneously crack during storage of the covered wires, and PVDF sheets formed by extrusion or drawing are liable to become relatively low in tear strength by reason of the occurrence of significant molecular orientation during the sheet-forming process. Besides, PVDF is not superior to other fluorohydrocarbon resins in low temperature characteristics represented by impact resistance and brittle point temperature and, therefore, is not suited to uses wherein good low temperature characteristics are strongly required. Though various proposals have been made for decreasing the crystallinity of PVDF and affording elasticity to PVDF by either of the above described copolymerization method or blending method, the above described problems and difficulties have not yet been solved or eliminated. For example, it has been reported that polymethyl acrylate is high in mutual solubility with PVDF so that a PVDF base resin composition which is elastic and excellent in drawability can be obtained by blending PVDF with polymethyl acrylate. In such a resin composition, however, it is inevitable that the content of fluorine considerably decreases as the elasticity is improved by the addition of polymethyl acrylate that does not contain fluorine in its molecular chain, and therefore the resin composition becomes degraded in some important properties such as resistance to chemicals and weather resistance.

Also it has been considered to blend PVDF with fluoroelastomer that is a fluorine-containing polymer low in glass transition temperature $T_g$. Actually, however, the blending does not give good results because fluoroelastomers are generally low in mutual solubility with PVDF and therefore the blend locally remains in heterogeneously mixed state and becomes inferior in dynamic properties, or it is difficult to blend a sufficient amount of fluoroelastomer with PVDF.

SUMMARY OF THE INVENTION

It is an object of the present invention to provide a fluorohydrocarbon resin that has elasticity and retains favorable properties characteristic of known fluorohydrocarbon resins.

It is another object of the invention to provide a method of producing a fluorohydrocarbon resin according to the invention.

It is a further object of the invention to provide a PVDF base resin composition which has elasticity and good low temperature characteristics and retains favorable properties of PVDF.

Essentially an elastic fluorohydrocarbon resin according to the invention is a copolymer comprising a first segment which is a fluorine-containing elastomeric polymer having a glass transition temperature below room temperature and a second segment which is a fluorine-containing crystalline polymer not lower than 130° C. in melting temperature, and one of the first and second segments is at least partly grafted to the other segment.

An elastic fluorohydrocarbon resin according to the invention is produced by either of the following two methods which are not different in fundamental concept.

The first method comprises the steps of (a) copolymerizing at least one first monomer, which comprises at least one fluorine-containing monomer, with at least one second monomer which has at least one double bond and at least one peroxy bond thereby preparing a fluorine-containing elastomeric polymer having a glass transition temperature below room temperature, and (b) polymerizing at least one third monomer, which comprises at least one fluorine-containing monomer and is capable of providing a crystalline polymer not lower than 130° C. in melting temperature, in a dispersion of the aforementioned elastomeric polymer in a liquid medium so as to cause decomposition of the peroxy groups in the elastomeric polymer thereby causing at least a portion of the third monomer to undergo graft copolymerization with the elastomeric polymer.

The second method comprises the steps of (a) copolymerizing at least one first monomer, which comprises at least one fluorine-containing monomer, with at least one second monomer which has at least one double bond and at least one peroxy bond thereby preparing a fluorine-containing crystalline polymer not lower than 130° C. in melting temperature, and (b) polymerizing at least one third monomer, which comprises at least one fluorine-containing monomer and is capable of providing an elastomeric polymer having a glass transition temperature below room temperature, in a dispersion of the aforementioned crystalline polymer in a liquid medium so as to cause decomposition of the peroxy groups in the crystalline polymer thereby causing at least a portion of the third monomer to undergo graft copolymerization with the crystalline polymer.

As stated above, the elastic fluorohydrocarbon resin of the invention is composed of two types of fluorine-containing polymers one of which is elastomeric and the other crystalline, and a primary feature of this resin resides in that selected one of these two types of fluorine-containing polymers is at least partly grafted to the other. We have succeeded in obtaining the elastic fluorohydrocarbon resin by discovering that the desired graft copolymerization can be realized when one of the two types of polymers that is chosen as the basic one has peroxy bonds in its molecular chain. Accordingly, at the first step of a production method according to the invention a suitable fluorine-containing monomer, or monomers, is copolymerized with another monomer which has both double bond and peroxy bond (such a monomer will be referred to as unsaturated peroxide). At the second step first there occurs decomposition of the peroxy bonds in the copolymer, e.g. an elastomeric copolymer, prepared at the preceding step, and then begins graft copolymerization of a crystalline polymer with the firstly prepared elastomeric copolymer at locations where suitable radicals are formed by the decomposition of the peroxy bonds. In this method it is possible to control the degree of elasticity of the produced resin by controlling the degree of polymerization at each of the aforementioned two steps or by varying the amount of the unsaturated peroxide used as the first step.

If it is intended to produce a graft copolymer of the above described type by a known method, it will be usual to employ either a so-called chain transfer method or an irradiation method. The chain transfer method is a simple and popular method, but in general the product of this method contains a relatively large amount of independent (not graft copolymerized) polymer. Furthermore, when this method is applied to fluorine-containing polymers the presence of C—F bonds becomes an obstacle to the formation of desired radicals on the basic polymer to which another polymer is expected to graft or becomes a cause of unwanted decomposition of the basic polymer accompanying the formation of some radicals. Therefore, this method must be judged to be unsuited for application to fluorine-containing polymers. The irradiation method will have wider applications, but at present it is difficult to practically utilize this method by reason of many restrictions or requirements including the use of very special apparatus. By comparison, the method of the invention is easy to industrialize and fairly high in the efficiency of graft copolymerization.

As is known, in the preparation of known graft copolymers it is difficult to obtain purely grafted copolymer alone. Also in the method of the invention it is probable that the product is a mixture of a grafted copolymer and the elastomeric and crystalline polymer segments respectively in independent form, but in such a mixture the grafted copolymer serves the purpose of rendering the state of mixing more uniform. Furthermore, it is presumed that at temperatures around room temperature the crystalline polymer segments will undergo cohesion with the effect of providing physical linking points to the rubber-like molecular chain and therefore contributing to the enhancement of the dynamic properties of the resin compared with a mere mixture of the elastomeric and crystalline polymer segments.

When vinylidene fluoride is used at the second step of the method of the invention as the fluorine-containing monomer which is capable of providing a crystalline polymer and is to graft copolymerize with an elastomeric polymer, the elastic fluorohydrocarbon resin as the product of this method is particularly useful for blending with PVDF to obtain a resin composition that retains advantageous properties of PVDF and is remarkably better than PVDF in elasticity, drawability, impact resistance and low temperature characteristics. Such an improved resin composition is obtained by blending 100 parts by weight of PVDF with 1 to 100 parts by weight of the elastic fluorohydrocarbon resin of the invention prepared by using vinylidene fluoride monomer.

DESCRIPTION OF THE PREFERRED EMBODIMENTS

An unsaturated peroxide for use in the first copolymerization step of the method according to the invention can be selected from various unsaturated peroxy esters and unsaturated peroxycarbonates. As an important matter for consideration at the selection, it is desired that the selected unsaturated peroxide and the fluorine-containing monomer(s) form a random copolymer. Therefore, it is necessary to select an unsaturated peroxide that readily undergoes random copolymerization with the employed fluorine-containing monomer(s). Also it is important to make selection such that the decomposition temperature of the peroxide bond in the employed unsaturated peroxide is higher than the copolymerization temperature at the first step. From a practical point of view, it is suitable to use an unsaturated peroxide of which the half-life in respect of the decomposition of peroxy bond becomes 10 hr at a temperature in the range from 40° to 120° C. Though it is possible to use an unsaturated peroxide of which the half-life becomes 10 hr at a higher temperature, in such a case it is desirable to use a suitable decomposition promotor so that the 10 hr half-life temperature may practically fall within the aforementioned range. Furthermore, it is required that the decomposition of the peroxide bond in the selected unsaturated peroxide gives radicals having the ability of initiating the polymerization of the fluorine-containing monomer(s).

As to the amount of the unsaturated peroxide at the first step of the method of the invention, it is preferred that the proportion of the unsaturated peroxide to the fluorine-containing monomer(s) falls in the range from 0.05:100 to 20:100 by weight. The use of a smaller amount of unsaturated peroxide will result in insufficient efficiency of grafting at the subsequent graft copolymerization step, but the use of a larger amount of unsaturated peroxide is liable to inhibit the fluorine-containing basic polymer in the product of the method from exhibiting its inherent properties.

Among unsaturated peroxy esters, t-butyl peroxymethacrylate, di(t-butyl peroxy) fumarate and t-butyl peroxycrotonate can be named as suitable examples. Among unsaturated peroxycarbonates, t-butyl peroxyallylcarbonate, t-hexyl peroxyallylcarbonate, 1,1,3,3-tetramethylbutyl peroxyallylcarbonate, t-butyl peroxymethallylcarbonate, 1,1,3,3-tetramethylbutyl peroxymethallylcarbonate, p-menthane peroxyallylcarbonate and p-menthane peroxymethallylcarbonate can be named as suitable examples.

Either a fluorine-containing elastomeric or rubber-like polymer or a fluorine-containing crystalline polymer can be employed as the basic polymer (to which the other grafts) in a fluorohydrocarbon resin according to the invention. In determining which to employ as the basic polymer, consideration should be given to the ability of the fluorine-containing monomer(s) to copolymerize with the unsaturated peroxide, polymerization temperatures at the respective steps of the method of the invention and the molecular weight of the polymer to be formed.

In this invention, a fluorine-containing elastomeric or rubber-like polymer refers to a polymer that is high in amorphousness and has a glass transition temperature $T_g$ below room temperature. For example, copolymers of vinylidene fluoride (abbreviated to VDF) and hexafluoropropene (HFP), ternary copolymers of VDF, HFP and tetrafluoroethylene (TFE), copolymers of VDF and chlorotrifluoroethylene (CIFE), copolymers of TFE and propylene, copolymers of TFE and a fluorine-containing vinyl ether and copolymers of a hydrocarbon diene compound and a fluorine-containing monomer are polymers of such class.

As to the fluorine-containing crystalline polymer of which the melting temperature is not lower than 130° C., typical examples are polytetrafluoroethylene, polychlorotrifluoroethylene, polyvinylidene fluoride (PVDF), polyvinyl fluoride, copolymers of TFE and ethylene, copolymers of CTFE and ethylene and copolymers of TFE and a fluorine-containing vinyl ether.

Where the present invention is utilized to provide an improved PVDF base resin composition in which some disadvantages of PVDF are compensated for by an elastic copolymer of the invention, VDF alone is used as the fluorine-containing monomer that provides the crystalline and grafting component of the elastic copolymer of the invention. The elastomeric component of the copolymer may be any one of the above named examples. For this use the amount of VDF to undergo graft copolymerization with the fluorine-containing elastomeric polymer is not particularly limited, though consideration should be given to the fact that VDF is employed mainly by reason of affording good mutual solubility with PVDF to the product of the graft copolymerization reaction. It is rather undesirable that the amount of VDF is more than sufficient to fulfill such a purpose. The degree of the mutual solubility can be estimated by measuring some properties of the obtained PVDF base resin composition such as the degree of transparency, tensile strength and elongation of a sheet formed of the resin composition. In general, it is suitable to determine the proportion of VDF to the fluorine-containing elastomeric polymer within the range from 1:100 to 100:100 by weight.

As mentioned hereinbefore, the proportion of the elastic copolymer obtained by using VDF to PVDF should be in the range from 1:100 to 100:100 by weight. If the amount of the elastic copolymer is less than 1 part the effect of the addition of this copolymer remains insufficient, but the addition of more than 100 parts of the elastic copolymer will possibly give a resin composition that lacks in the favorable properties of PVDF as a crystalline polymer.

The invention will further be illustrated by the following nonlimitative examples.

EXAMPLE 1

At the first step, 1000 g of purified water, 2 g of potassium persulfate, 3 g of ammonium perfluorooctanoate and 2 g of t-butyl peroxyallylcarbonate were introduced into a 2-liter stainless steel autoclave which was secured against pressures up to 100 atm, and, after exhausting the autoclave of the gas atmosphere, 250 g of vinylidene fluoride monomer and 151 g of chlorotrifluoroethylene monomer were additionally charged into the autoclave. The resultant mixture was subjected to polymerization reaction at 50° C. for 20 hr with continuous stirring. The product of the reaction had the appearance of white latex, and by a salting-out treatment it turned into a rubber-like powder. The powder was washed with water, dried in vacuum, then washed with n-hexane to completely remove unreacted residue of t-butyl peroxyallylcarbonate and again dried in vacuum. Obtained as the result was 320 g of a copolymer in the form of white powder.

A characteristic curve obtained by thermal analysis of the copolymer by using a scanning differential calorimeter (DSC) exhibited an exothermic peak at 160°–180° C. The peak was judged to be attributed to the decomposition of peroxy bond. By DSC analysis at low temperatures, the glass transition temperature $T_g$ of the copolymer was determined to be $-21°$ C. By iodimetric titration, the content of active oxygen in the copolymer was measured to be 0.042%.

At the second step, 60 g of the above described copolymer and 375 g of Freon R-113 (1,1,2-trichlorotrifluoroethane) were introduced into a 500 ml stainless steel autoclave which was secured against pressures up to 100 atm. After exhausting the autoclave of the gas atmosphere, 30 g of vinylidene fluoride monomer was additionally charged into the autoclave, and the resultant mixture was subjected to graft copolymerization reaction at 95° C. for 24 hr.

A copolymer formed by this reaction was separated from the solvent and dried to obtain 82.3 g of white powder. By DSC analysis the melting temperature of this copolymer was found to be 155°–160° C.

The copolymer prepared in this example was first kneaded by means of two 4-inch rolls which were kept heated at 180° C. and then press-shaped at 200° C. into a 1 mm thick sheet. This sheet was semitransparent and elastic and flexible. Some physical properties of this polymer sheet measured at 23° C. are shown in Table 1 together with the corresponding data obtained on the samples prepared in Comparative Experiments and Example 2 described hereinafter.

COMPARATIVE EXPERIMENT 1

The first step of Example 1 to copolymerize vinylidene fluoride with chlorotrifluoroethylene was performed generally similarly but without using t-butyl peroxyallylcarbonate. The product was 360 g of a rubber-like copolymer. By DSC analysis, the glass transition temperature $T_g$ of this copolymer was determined to be $-21°$ C.

A mixture of 60 g of the rubber-like copolymer and 22.3 g of PVDF in the form of pellets (Kynar 460 of Pennwalt Co.) was first kneaded by means of two 4-inch rolls which are kept heated at 180° C. and then press-shaped at 200° C. into a 1 mm thick sheet.

As can be seen in Table 1, the polymer sheet produced in this experiment was inferior to the polymer sheet produced in Example 1 particularly significantly in the break strength and elongation at break.

active oxygen in the copolymer was measured to be 0.18%.

At the second step, 50 g of the above described copolymer and 435 g of Freon R-113 were introduced into a 500 ml stainless steel autoclave proof up to 100 atm, and, after exhausting the autoclave of the atmosphere, 70 g of vinylidene fluoride monomer and 55 g of hexafluoropropene monomer were additionally charged into the autoclave. The resultant mixture was subjected to graft copolymerization reaction at 95° C. for 24 hr. A copolymer formed by this reaction was separated from the solvent and dried to obtain 112 g of white powder. By DSC analysis, the glass transition temperature $T_g$ of this copolymer was determined to be $-19°$ C.

This copolymer was first kneaded by means of two 4-inch rolls which were kept heated at 160° C. and then press-shaped at 210° C. into a 1 mm thick sheet. This sheet was elastic and flexible and had a white color.

COMPARATIVE EXPERIMENT 2

The first step of Example 2 to polymerize chlorotrifluoroethylene was performed generally similarly but without using t-butyl peroxyallylcarbonate. The product was 152 g of polychlorotrifluoroethylene.

A mixture of 50 g of this polymer and 62 g of a commercially available unvulcanized fluoroelastomer, Viton B-P of DuPont Co., was first kneaded by means of the aforementioned rolls which were kept heated at 160° C. and then press-shaped at 210° C. into a 1 mm thick sheet. However, this sheet was very brittle and fragile, and therefore it was impracticable to measure the dynamic properties of this sheet.

TABLE 1

|  | Example 1 | Comparative Experiment 1 | Example 2 | Reference* PVDF | PCTFE |
|---|---|---|---|---|---|
| Break Strength (kg/cm$^2$) | 279 | 139 | 221 | 390–520 | 315–420 |
| Elongation at Break (%) | 470 | 235 | 340 | 100–300 | 80–250 |
| Complex Modulus of Elasticity in absolute value [E] (dyne/cm$^2$) | | | | | |
| 0° C. | $9.8 \times 10^9$ | $9.7 \times 10^9$ | $1.2 \times 10^{10}$ | $2.7 \times 10^{10}$ | $2.9 \times 10^{10}$ |
| 20° C. | $3.6 \times 10^9$ | $3.2 \times 10^9$ | $6.0 \times 10^9$ | $2.2 \times 10^{10}$ | $2.1 \times 10^{10}$ |
| 40° C. | $1.7 \times 10^9$ | $1.1 \times 10^9$ | $2.4 \times 10^9$ | $1.6 \times 10^{10}$ | $1.4 \times 10^{10}$ |
| 60° C. | $9.5 \times 10^8$ | $8.5 \times 10^8$ | $1.2 \times 10^9$ | $8.9 \times 10^9$ | $9.6 \times 10^9$ |
| Hardness (Shore D) | 43 | 45 | 52 | 75 | 80 |

*The data on the complex modulus of elasticity and hardness were obtained by measurements on Kynar 460 (PVDF) of Pennwalt Co. and Daiflon (PCTFE) of Daikin Co. both in rolled and pressed sheet form. The tensile strength and elongation data are quoated from "Modern Plastics Encylopedia 76/77".

EXAMPLE 2

At the first step, 316 g of Freon R-113, 0.75 g of diisopropylperoxydicarbonate and 5 g of t-butyl peroxyallylcarbonate were introduced into a 500 ml stainless steel autoclave, and, after exhausting the autoclave of the atmosphere, 250 g of chlorotrifluoroethylene monomer was additionally charged into the autoclave. The resultant mixture was subjected to polymerization reaction at 40° C. for 24 hr. The product of the reaction was separated from the solvent, washed and dried to obtain 141 g of white powder.

The DSC curve of the thus formed copolymer had an exothermic peak at 160°–180° C., which was attributed to the decomposition of peroxy bond, and the melting temperature of the copolymer was found to be 195°–197° C. By idiometric titration, the content of The measurement of the respective items in Table 1 were made by the following methods.

The break strength and elongation were measured at 23° C. by a tension test method generally in accordance with JIS (Japanese Industrial Standard) K 6301. The test pieces were of the dumbbell shape, and the tension rate was 200 mm/min.

The absolute value of the complex modulus of elasticity was measured on test pieces 100 mm × 8 mm wide and 1 mm thick by using a dynamic viscoelasticity tester at a constant frequency of 110 Hz.

The Shore hardness was measured on test pieces 80 mm × 40 mm wide and 3.2 mm thick by a method generally in accordance with ASTM-D-1484.

EXAMPLE 3

The grafted copolymer of Example 1 was blended with PVDF (Kynar 460) in four different proportions. That is, the amount of the copolymer added to 100 g of PVDF was varied to 10 g, 20 g, 30 g and 80 g. Each mixture of the copolymer and PVDF was first kneaded by means of two 4-inch rolls which were kept heated at 190° C. and then press-shaped at 210° C. into a 1 mm thick sheet.

The sheets of the respective resin compositions were subjected to measurements of physical properties. The results are shown in Table 2 together with corresponding data obtained on the samples prepared in Comparative Experiments and Examples described hereinafter.

COMPARATIVE EXPERIMENT 3

In this experiment, 20 g of the rubber-like copolymer prepared in Comparative Experiment 1 without using any unsaturated peroxide was blended with 100 g of PVDF (Kynar 460). By the process described in Example 3, the mixture was kneaded and press-shaped into a 1 mm thick sheet.

As can be seen in Table 2, the resin composition sheet produced in this experiment was inferior to the resin composition sheet produced in Example 3 particularly significantly in the break strength and elongation at break.

EXAMPLE 4

At the first step, 300 g of purified water, 0.6 g of potassium persulfate, 1 g of ammonium perfluorooctanoate and 1 g of t-butyl peroxyallylcarbonate were introduced into a 500 ml stainless steel autoclave, and, after exhausting of the autoclave of the gas atmosphere, 67.2 g of vinylidene fluoride monomer and 52.8 g of hexafluoropropene monomer were additionally charged into the autoclave. The resultant mixture was subjected to polymerization reaction at 55° C. for 17 hr with continuous stirring. A white copolymer formed by the reaction was separated from the liquid phase, washed with water and methanol and dried. The dried product was a rubber-like copolymer which weighed 83.5 g. The glass transition temperature $T_g$ of this copolymer was measured to be $-19°$ C., and the content of active oxygen in the copolymer was 0.063%.

At the next step, 60 g of the above described copolymer and 375 g of Freon R-113 were introduced into a 500 ml stainless steel autoclave, and, after exhausting of the autoclave of the gas atmosphere, 40 g of vinylidene fluoride monomer was additionally charged into the autoclave. The resultant mixture was subjected to graft polymerization at 95° C. for 24 hr. The product of this reaction was 81 g of white copolymer.

At the subsequent blending step, a mixture of 100 g of PVDF (Kynar 460) and 20 g of the grafted copolymer was kneaded and press-shaped into a 1 mm thick sheet by the process described in Example 3.

COMPARATIVE EXPERIMENT 4

In this experiment, 20 g of the aforementioned fluoroelastomer Viton B-P was blended with 100 g of PVDF (Kynar 460). The resin-rubber mixture was kneaded and press-shaped into a 1 mm thick sheet by the process described in Example 3.

TABLE 2

|  | Example 3 | | | | Example 4 | Comp. Exper. 3 | Comp. Exper. 4 | Reference* PVDF |
| --- | --- | --- | --- | --- | --- | --- | --- | --- |
| Amount of Polymer Added to PVDF (PHR) | 10 | 20 | 30 | 0 | 20 | 20 | 20 | 0 |
| Tensile Strength (kg/cm$^2$) | | | | | | | | |
| Yield Strength | 427 | 390 | 354 | 216 | 372 | 363 | 350 | 505 |
| Break Strength | 380 | 412 | 425 | 335 | 355 | 290 | 278 | 380 |
| Elongation at Break (%) | 360 | 380 | 420 | 440 | 400 | 170 | 120 | 250 |
| Complex Modulus of Elasticity [E] in absolute value (dyne/cm$^2$) | | | | | | | | |
| 20° C. | $1.9 \times 10^{10}$ | $1.7 \times 10^{10}$ | $1.3 \times 10^{10}$ | $9.6 \times 10^9$ | $1.6 \times 10^{10}$ | $1.6 \times 10^{10}$ | $1.6 \times 10^{10}$ | $2.2 \times 10^9$ |
| 50° C. | $1.0 \times 10^{10}$ | $9.5 \times 10^9$ | $7.4 \times 10^9$ | $2.2 \times 10^9$ | $7.8 \times 10^{10}$ | $8.0 \times 10^9$ | $7.5 \times 10^9$ | $1.2 \times 10^9$ |
| Hardness (Shore D) | 76 | 75 | 73 | 62 | 73 | 75 | 74 | 78 |
| Brittle Point Temperature (°C.) | $-43$ | $-47$ | $-50$ | $-52$ | $-45$ | $-40$ | $-33$ | $-36$ |
| Impact Resistance (kg cm/cm$^2$) | 34 | >60 (no break) | >60 (no break) | >60 (no break) | >60 (no break) | >60 (no break) | 7 | 11 |

*Data obtained by measurements on Kynar 460 of Pen Walt Co. in rolled and pressed sheet form.

The measurements of the tensile strength, elongation, complex modulus of elasticity and hardness were made by the test methods mentioned in connection with Table 1. The brittle point temperature was measured by the method according to JIS k 6745. The impact resistance was measured at 23° C. by the method according to ASTM-D-256, using test pieces 63.5 mm × 12.7 mm wide and 6.4 mm thick and formed with an Izod notch.

What is claimed is:

1. An elastic fluorohydrocarbon resin which consists essentially of a copolymer comprising a first segment which is a fluorine-containing elastomeric polymer having a glass transition temperature below room temperature and a second segment which is a fluorine-containing crystalline polymer not lower than 130° C. in melting temperature, one of said first and second segments having at least one peroxy bond capable of decomposition during graft copolymerization and the other of said segments being capable of undergoing graft copolymerization with said segment having at least one peroxy bond, said other segment being at least partly grafted to said segment having at least one peroxy bond.

2. A resin composition comprising 100 parts by weight of polyvinylidene fluoride and 1 to 100 parts by weight of an elastic fluorohydrocarbon resin, said elastic fluorohydrocarbon resin consisting essentially of a copolymer comprising a first segment which comprises a fluorine-containing elastomeric polymer having a glass transition temperature below room temperature and a second segment which comprises polyvinylidene fluoride and which is at least partly grafted to said first segment.

3. A resin composition according to claim 2, wherein said elastomeric polymer is produced by copolymerizing a mixture comprising an unsaturated peroxy monomer and a combination of other monomers selected from the group consisting of a combination of vinylidene fluoride and hexafluoropropene, a combination of vinylidene fluoride, hexafluoropropene and tetrafluoroethylene, a combination of vinylidene fluoride and chlorotrifluoroethylene, a combination of tetrafluoroethylene and propylene, and a combination of tetrafluoroethylene and a fluorine-substituted vinyl ether.

4. A resin composition according to claim 3, wherein the weight ratio of said second segment to said first segment in said elastic fluorocarbon resin is in the range from 1:100 to 100:100.

5. An elastic fluorohydrocarbon according to claim 1, wherein said copolymer comprises:
(a) a first segment which comprises a fluorine-containing lastomeric polymer having a glass transition temperature below room temperature and at least one peroxy bond capable of decomposition during graft copolymerization, and
(b) a second segment which comprises a fluorine-containing crystalline polymer which has a melting temperature not lower than 130° C. and which is capable of undergoing graft copolymerization with said elastomeric polymer,
said second segment being at least partly grafted to said first segment.

6. A fluorohydrocarbon resin according to claim 5, wherein said elastomeric polymer is produced by copolymerizing a mixture comprising an unsaturated peroxy monomer and a combination of other monomers selected from the group consisting a combination of vinylidene fluoride and hexafluoropropene, a combination of vinylidene fluoride, hexafluoropropene and tetrafluoroethylene, a combination of vinylidene fluoride and chlorotrifluoroethylene, a combination of tetrafluoroethylene and propylene, and a combination of tetrafluoroethylene and a fluorine-substituted vinyl ether.

7. A fluorohydrocarbon resin according to claim 6, wherein said crystalline polymer is selected from the group consisting of polytetrafluoroethylene, polychlorotrifluoroethylene, polyvinylidene fluoride, polyvinyl fluoride, copolymers of tetrafluoroethylene and ethylene, copolymers of chlorotrifluoroethylene and ethylene, and copolymers of tetrafluoroethylene and fluorine-substituted vinyl ether.

8. An elastic fluorohydrocarbon resin according to claim 1, wherein said copolymer comprises:
(a) a first segment which comprises a fluorine-containing crystalline polymer which has a melting temperature not lower than 130° C. and has at least one peroxy bond capable of decomposition during grafted copolymerization; and
(b) a second segment which comprises a fluorine-containing elastomeric polymer having a glass transition temperature below room temperature and which is capable of undergoing grafted copolymerization with said crystalline polymer,
said second segment being at least partly grafted to said first segment.

9. A fluorohydrocarbon resin according to claim 8, wherein said crystalline polymer is a copolymer produced by copolymerizing a mixture comprising an unsaturated peroxy monomer and another monomer selected from the group consisting of tetrafluoroethylene, chlorotrifluoroethylene, vinylidene fluoride, vinylfluoride, and ethylene.

10. A fluorhydrocarbon resin according to claim 9, wherein said elastomeric polymer is selected from the group consisting of copolymers of vinylidene fluoride and hexafluoropropene, copolymers of vinylidene fluoride, hexafluoropropene, and tetrafluoroethylene, copolymers of vinylidene fluoride and chlorotrifluoroethylene, copolymers of tetrafluoroethylene and propylene, and copolymers of tetrafluoroethylene and a fluorine-substituted vinyl ether.

11. An elastic fluorohydrocarbon resin which consists essentially of a copolymer comprising:
(a) a first segment which comprises a fluorine-containing elastomeric polymer having a glass transition temperature below room temperature and being selected from the group consisting of copolymers produced by copolymerizing a mixture comprising an unsaturated peroxy monomer and a combination of other monomers selected from the group consisting of a combination of vinylidene fluoride and hexafluoropropene, a combination of vinylidene fluoride, hexafluoropropene and tetrafluoroethylene, a combination of vinylidene fluoride and chlorotrifluoroethylene, a combination of tetrafluoroethylene and propylene, and a combination of tetrafluorethylene and fluorine-substituted vinyl ether; and
(b) a second segment comprising a fluorine-containing crystalline polymer having a melting temperature lower than 130° C. and being selected from the group consisting of polytetrafluoroethylene, polychlorotrifluoroethylene, polyvinylidene fluoride, polyvinyl fluoride, copolymers of tetrafluoroethylene and ethylene, copolymers of chlorotrifluoroethylene and ethylene, and copolymers of tetrafluoroethylene and fluorine-substituted vinyl ether,
said second segment being at least partly grafted to said first segment.

12. An elastic fluorohydrocarbon resin which consists essentially of a copolymer comprising:
(a) a first segment which comprises a fluorine-containing crystalline polymer having a melting temperature not lower than 130° C. and being a copolymer produced by copolymerizing a mixture comprising an unsaturated peroxy monomer and monomers selected from the group consisting of tetrafluoroethylene, chlorotrifluoroethylene, vinylidene fluoride, vinyl fluoride, and ethylene; and
(b) a second segment which comprises a fluorine-containing elastomeric polymer having a glass transition temperature below room temperature and being selected from the group consisting of copolymers of vinylidene fluoride and hexafluoropropene, copolymers of vinylidene fluoride, hexafluoropropene and tetrafluoroethylene, copolymers of vinylidene fluoride and chlorotrifluoroethylene, copolymers of tetrafluoroethylene and propylene, and copolymers of tetrafluoroethylene and a fluorine-substituted vinyl ether,
said second segment being at least partly grafted to said first segment.

13. A method of producing an elastic fluorohydrocarbon resin, comprising the steps of:
    (a) copolymerizing at least one first fluorine-containing monomer with at least one second monomer having (i) at least one double bond and (ii) at least one peroxy bond having a decomposition temperature higher than the reaction temperature of said copolymerizing to produce a fluorine-containing elastomeric polymer having a glass transition temperature below room temperature and a peroxy bond capable of decomposition during graft copolymerization, the weight ratio of said second monomer to said first fluorine-containing monomer being in the range from about 0.05:100 to 20:100;
    (b) providing a dispersion of said fluorine-containing elastomeric polymer in a liquid medium, said dispersion being substantially free of unreacted said first monomer and said second monomer;
    (c) introducing into said dispersion at least one third monomer which comprises at least one fluorine-containing monomer and which is capable of providing a crystalline polymer having a melting temperature not lower than 130° C.; and
    (d) polymerizing said third monomer in said dispersion so as to cause decomposition of said peroxy bond,
thereby causing at least a portion of said third monomer to undergo graft copolymerization with said elastomeric polymer.

14. A method of producing an elastic fluorohydrocarbon resin, comprising the steps of:
    (a) copolymerizing at least one first fluorine-containing monomer with at least one second monomer having (i) at least one double bond and (ii) at least one peroxy bond having a decomposition temperature higher than the reaction temperature of said copolymerizing to produce a fluorine-containing crystalline polymer having a melting temperature not lower than 130° C. and a peroxy bond capable of decomposition during grafted copolymerization, the weight ratio of said second monomer to said first fluorine-containing monomer being in the range of 0.05:100 to 20:100;
    (b) providing a dispersion of said fluorine-containing crystalline polymer in a liquid medium, said dispersion being substantially free of unreacted said first monomer and said second monomer;
    (c) introducing into said dispersion at least one third monomer which comprises at least one fluorine-containing monomer and which is capable of providing an elastomeric polymer having a glass transition temperature below room temperature; and
    (d) polymerizing said third monomer in said dispersion so as to cause decomposition of said peroxy bond,
thereby causing at least a portion of said third monomer to undergo graft copolymerization with said crystalline polymer.

15. A method according to claim 13, wherein said first fluorine-containing monomer comprises a combination selected from the group consisting of a combination of vinylidene fluoride and hexafluoropropene, a combination of vinylidene fluoride, hexafluoropropene and tetrafluoroethylene, a combination of vinylidene fluoride and chlorotrifluoroethylene, a combination of tetrafluoroethyulene and proplylene, and a combination of tetrafluoroethylene and a fluorine-substituted vinyl ether.

16. A method according to claim 15, wherein said second monomer is selected from the group consisting of t-butyl peroxymethacrylate, di(t-butyl peroxy)fumarate, t-butyl peroxycrotonate, t-butyl peroxyallylcarbonate, t-hexyl peroxyallylcarbonate, 1,1,3,3-tetramethylbutyl peroxyallylcarbonate, t-butyl peroxymethallylcarbonate, 1,1,3,3-tetramethylbutyl peroxymethallylcarbonate, p-menthane peroxyallylcarbonate and p-menthane peroxymethallylcarbonate.

17. A method according to claim 16, wherein said fluorine-containing monomer comprising said third monomer at step (c) is selected from the group consisting of tetrafluoroethylene, chlorotrifluoroethylene, polyvinylidene fluoride and fluorine-substituted vinyl ether.

18. A method according to claim 14, wherein said first fluorine-containing monomer at step (a) is selected from the group consisting of tetrafluoroethylene, chlorotrifluoroethylene, vinylidene fluoride, vinyl fluoride and fluorine-substituted vinyl ether.

19. A method according to claim 18, wherein said second monomer is selected from the group consisting of t-butyl peroxymethacrylate, di(t-butyl peroxy)fumarate, t-butyl peroxycrotonate, t-butyl peroxyallylcarbonate, t-hexyl peroxyallylcarbonate, 1,1,3,3-tetramethylbutyl peroxyallylcarbonate, t-butyl peroxymethallylcarbonate, 1,1,3,3-tetramethylbutyl peroxymethallylcarbonate, p-menthane peroxyallylcarbonate and p-menthane peroxymethallylcarbonate.

20. A method according to claim 19, wherein said third monomer comprises a combination selected from the group consisting of combinations of vinylidene fluoride and hexafluoropropene, combinations of vinylidene fluoride, hexafluoropropene and tetrafluoroethylene, combinations of vinylidene fluoride and chlorotrifluoroethylene, combinations of tetrafluoroethylene and propylene, combinations of tetrafluoroethylene and a fluorine-substituted vinyl ether.

* * * * *